United States Patent [19]

McLennan et al.

[11] Patent Number: 4,699,217
[45] Date of Patent: Oct. 13, 1987

[54] DIRECT CONNECT PLUMBING FIXTURE

[75] Inventors: William R. McLennan, Easton; Albert J. Piccotti, Martins Creek, both of Pa.; Robert Rung, Hopatcong, N.J.

[73] Assignee: Victaulic Company of America, Easton, Pa.

[21] Appl. No.: 885,023

[22] Filed: Jul. 14, 1986

Related U.S. Application Data

[63] Continuation of Ser. No. 619,802, Jun. 12, 1984, abandoned.

[51] Int. Cl.⁴ .............................................. F16L 19/03
[52] U.S. Cl. ...................................... 169/37; 239/600; 29/57; 29/526 R; 411/340; 411/400; 285/209
[58] Field of Search ............... 29/57 R, 526 R, 428; 239/600; 169/37; 285/208, 209, 161; 411/340, 344, 400, 401

[56] References Cited

U.S. PATENT DOCUMENTS 1,355,450 10/1920 Carlson ............................. 285/209
2,241,293 5/1941 Campbell .......................... 285/208
3,812,910 5/1974 Wellstein ......................... 285/209
3,981,061 9/1976 Jackson et al. .................. 285/209

Primary Examiner—Andres Kashnikow
Assistant Examiner—Kevin Patrick Weldon
Attorney, Agent, or Firm—Abelman Frayne Rezac & Schwab

[57] ABSTRACT

A plumbing fitting is formed integrally with a quick connect coupling, the coupling having a recessed shank portion permitting a locknut and a gasket receiving collar to be assembled onto a threaded shank of the coupling by passing them over a saddle of the coupling the plumbing fitting being connected to a pipe wall by the clamping cooperation between the saddle and collar.

6 Claims, 10 Drawing Figures

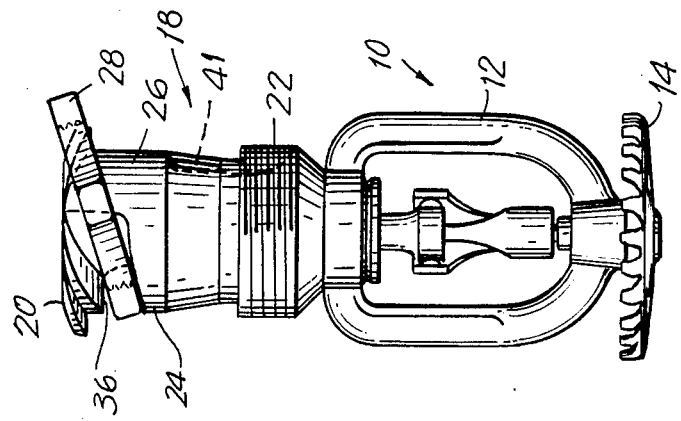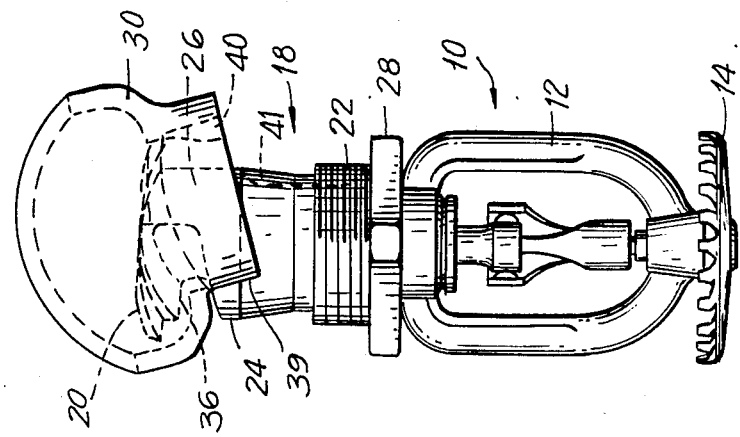

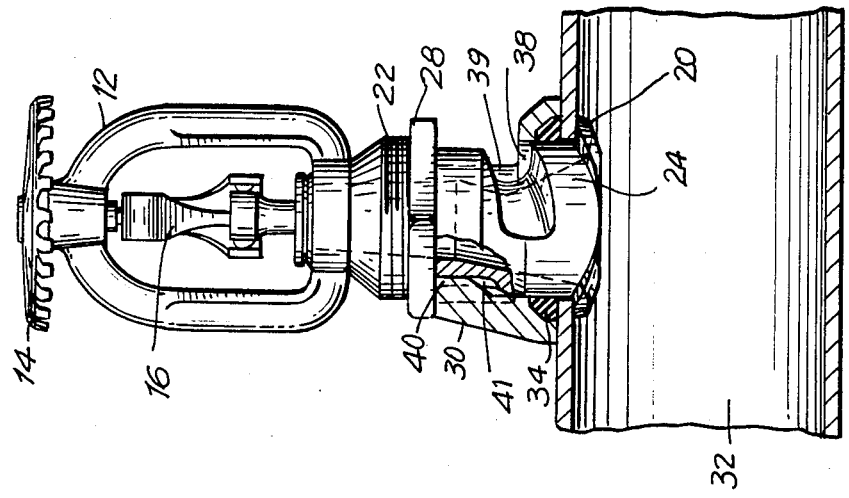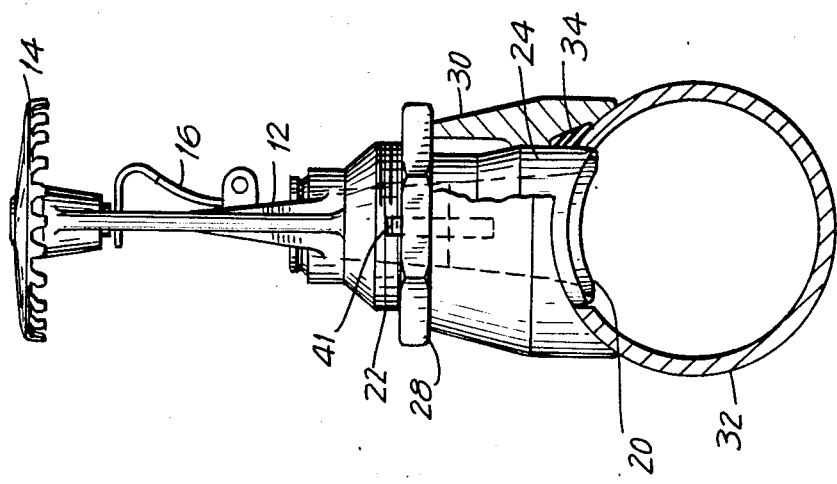

DIRECT CONNECT PLUMBING FIXTURE

This is a continuation of Application Ser. No. 619,802 filed June 12, 1984 now abandoned.

FIELD OF THE INVENTION

This invention relates to a plumbing fitting which is directly connectable to a plumbing system in absence of the usual threaded or soldered joint, such as is usually provided by an elbow, tee or the like. While having general application in plumbing systems, the present invention has particular utility in the assembly of fire extinguishing sprinkler systems, in that it permits the rapid and secure assembly of the sprinkler heads in locations having difficult or restricted assessibility.

BACKGROUND OF THE INVENTION

Plumbing fittings have been previously proposed in which a saddle provided at one end of the fitting is to be inserted through an aperture in a pipe and the fitting then positioned to bring the saddle into straddling relationship with the pipe interior on opposite sides of the aperture. The fitting is then secured to the pipe by passing a gasket containing collar over a threaded shank of the fitting from the end of the shank remote from the saddle, and by then threading a nut onto the shank from the end of the shank remote from the saddle to draw the saddle into positive seating engagement with the pipe interior, and to move the gasket containing collar into proper seating and sealing engagement with the pipe exterior.

Examples of such direct connectors are to be found in U.S. Pat. Nos. 377,506, Whiter; 1,049,283, Westphal; 1,355,450, Carlson; 3,033,514, Grosch; 3,981,061, Jackson et al; and in British Pat. Nos. 101689 of 1916 and 336735 of 1930.

These prior patents disclose direct connect plumbing fittings having features in common, namely a threaded tubular shank having an elongate saddle at one end thereof, the saddle being of less width than the diameter of the aperture into which the fitting is to be inserted and being of greater length than the said diameter. The saddle and the shank are so configured as to permit insertion of one end of the saddle into the aperture in the pipe at an angle thereto. The fitting is then moved longitudinally of the pipe in the direction of the said one end of the saddle, and the shank is then moved angularly in order to move or rotate the opposite end of the saddle into the pipe interior. The fitting is then moved reversely longitudinally of the pipe to bring the said opposite end of the saddle into engagement with the pipe interior, a shoulder or stop conveniently being provided on the said one end of the saddle for engagement within the aperture in the pipe to locate the fitting in its desired orientation during and subsequent to the securing of the fitting to the pipe by the gasket containing collar and the threaded nut.

While these structures serve admirably in their intended function of securing a fitting in a blind hole in a pipe or other structure, they are limited in their capability to that of providing a threaded nipple extending laterally of the pipe. A separate and independent fitting must then be attached to the nipple in the conventional manner, usually by threading the said independent fitting onto the nipple.

In these prior constructions of direct connect fitting, the formation of the direct connect fitting integrally with some other fitting such as a faucet, stopcock, sprinkler head or the like, is precluded in that there is no way of passing the gasket containing collar and its associated retaining nut onto the threaded shank of the direct connect fitting. A direct connect fitting having a integral faucet has been proposed in U.S. Pat. No. 832,287, Beach. This prior patentee, however, did not foresee that the internally threaded gasket containing collar could not be assembled onto the threaded shank in the manner contemplated, owing to the presence of the saddle portion formed integrally with the threaded shank.

THE INVENTIVE CONCEPT

The object of this invention is to provide a plumbing fitting having the advantages of known direct connect connectors, and which additionally has the capability of being formed integrally with some other fitting, such as a faucet, stopcock or the like, and in particular as an integral portion of a sprinkler head construction.

The advantages of forming the direct connect connector integrally with a sprinkler head or similar member are manifest. Not only can the integrated construction be manufactured at a cost comparatively lower than that of corresponding separate integers, but also, the assembly and sealing of one of those integers onto the other is eliminate in its entirety, as is the requirement for accurate angular positioning of the respective integers relative to each other in the case of a faucet or stopcock. Further, and this is of particular advantage in a sprinkler head construction, the unitary assembly can be quickly assembled directly onto a pipe of a sprinkler system, even in difficult and relatively inaccessible locations, using only a single hand to complete the entire assembly operation.

According to the present invention, the saddle, its associated threaded shank, and the gasket containing collar and its retaining nut are so configured that the retaining nut and the gasket containing collar can be assembled onto the shank from the saddle supporting end of the shank i.e., from that end of the shank that is remote from the sprinkler head or other such fitting.

This is accomplished by providing a recessed portion of the shank intermediate the threaded shank and the saddle and adjacent one end of the saddle, the axial width of the recess being greater than the axial width of the nut, and the diameter of the threaded shank being greater than the distance between the other end of the saddle and a surface of the recessed portion that is closest to the said other end of said saddle.

By this construction, the retaining nut can be passed axially of the saddle from the said one end and moved into the recess until such time as the internal periphery of the nut engages the wall of the recess and is precluded from further such movement longitudinally of the saddle. At this time, however, the nut can be moved angularly about the line of engagement of the inner periphery of the nut and the wall of said recess, and can be passed over the said other end of the saddle to bring it into encircling relationship with the said recessed portion. Then, by simple reorientation of the nut, it can be brought into axial alignment with the threaded shank, and threaded onto the shank. This procedure is then followed in an identical manner with the collar to move the collar over the saddle, to then bring it into encircling relationship with the recessed portion, and subsequently, to permit the collar to be slid axially onto the threaded shank. This procedure is then followed in an identical manner with the gasket, which is then pressed into the collar and onto the section of the shank providing the recessed portion.

As will be appreciated, the gasket containing collar and the contained gasket will be appropriately configured for the gasket to be brought into intimate sealing relationship with the exterior wall of the pipe at the time the gasket containing collar is moved into engagement with the pipe by the locknut. In addition to sealing against the exterior surface of the pipe, the gasket provides a second sealing portion for engagement with an unthreaded cylindrical sealing land of the shank. Preferably, the gasket is a force fit on the said sealing land to retain the gasket and the collar against unintended or accidental movement relative to the shank and the saddle during manual handling of the sprinkler assembly prior to and during its positioning and securement to the pipe.

As will be further appreicated, the said recess need not extend throughout the entire axial length of the said recessed portion. In this way, the recessed portion can be provided with dual end sealing lands concentric with the threaded shank and which are sealingly engaged by the gasket.

DESCRIPTION OF THE DRAWINGS

A preferred embodiment of the invention will now be described with reference to the accompanying drawings, which illustrate a unitary sprinkler head construction according to the present invention having an integral direct connect connector. In the drawings:

FIG. 2 is a front elevation of the sprinkler head assembly of FIG. 1, and illustrates the manner in which the nut can be passed over the saddle;

FIG. 3 is a front elevation of the sprinkler head assembly of FIG. 1, FIG. 3, showing the nut as having been threaded on the shank, and illustrating the manner in which the collar is to be moved into position on the threaded shank;

FIG. 5 is a side elevation of an alternative preferred form of sprinkler head assembly according to the present invention, shown partially in cross-section;

FIG. 6 is a front elevation of the sprinkler head assembly of FIG. 5, again shown partially in cross-section;

Referring more particularly to FIGS. 1 to 4, the sprinkler head assembly is indicated generally at 10, and includes a conventional harp 12 and diffuser 14, together with a conventional thermally activated release mechanism 16.

Figure 10:
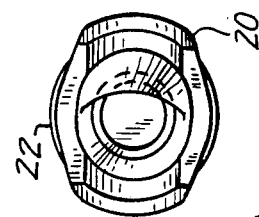
FIG. 10 is an underside plan view of the saddle of FIGS. 5 through 10.
Figure 7:
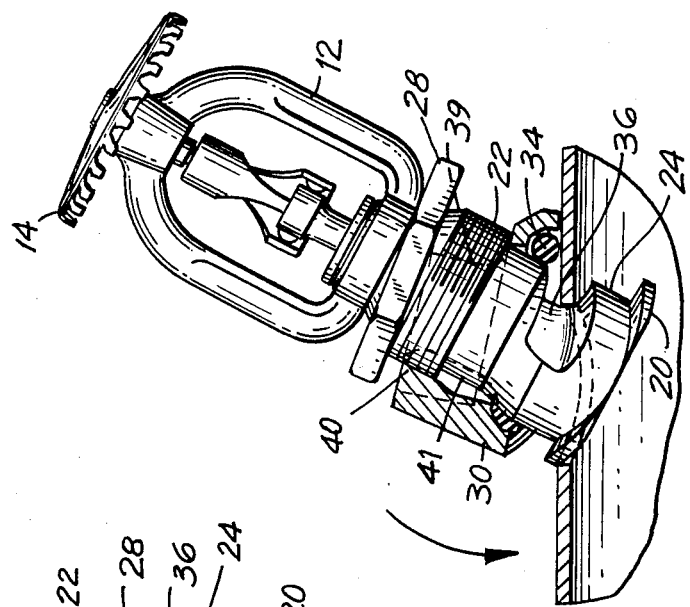

The harp 12 is formed integrally with a shank portion 18, and is of greater width than the diameter of the shank portion 18. The shank portion 18 terminates in a saddle 20, the configuration of the saddle 20 being illustrated in FIG. 10.

The shank portion 18 includes three integral coaxial sections positioned adjacent to each other, namely, a threaded section 22, a sealing land 24, and a recessed portion 26 arranged immediately adjacent the saddle 20.

The threaded section 22 is adapted to receive a nut 28, which is employed for forcing the saddle into clamping engagement with a pipe 32, and for forcing a gasket containing collar 30 into seating and clamping engagement with the pipe 32, the collar 30 containing an elastomeric gasket 34.

Figure 4:
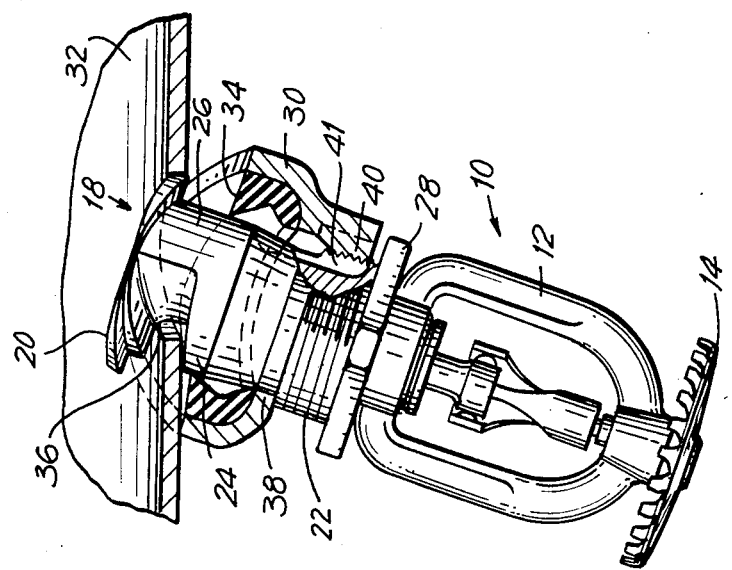
FIG. 4 is a front elevation, partially in cross-section corresponding with FIG. 1, and illustrating the manner in which the assembly is to be moved into position on a pipe.
Figure 1:
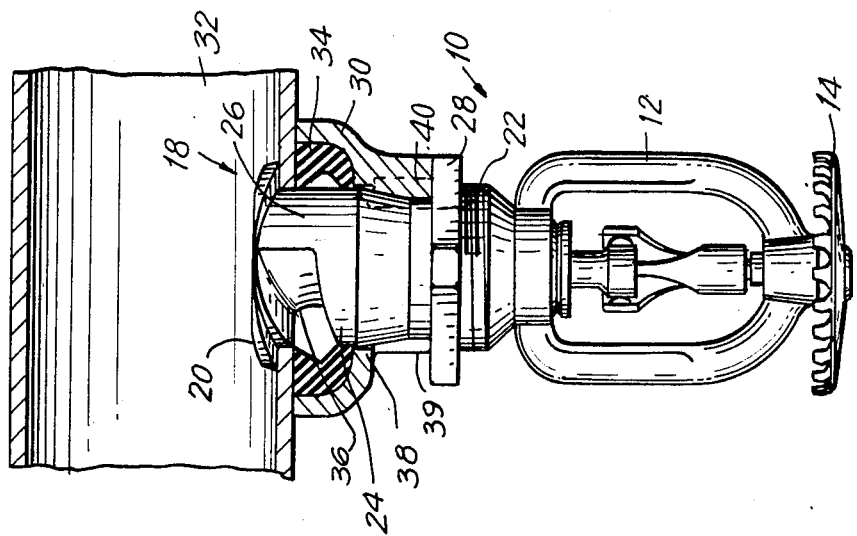
FIG. 1 is a front elevation, partially in section, of a unitary direct-connect sprinkler head assembly in accordance with the present invention, the gasket containing collar and the contained gasket having been shown in cross-section for convenience of illustration.
Figure 8:
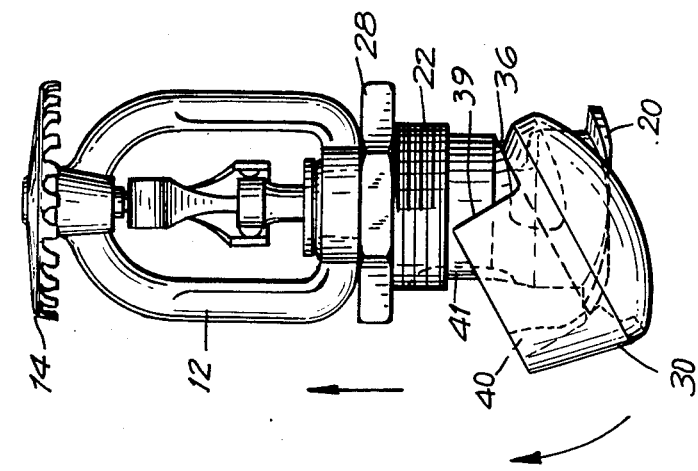
FIGS. 7, 8 and 9 illustrate the manner in which the nut and collar may be assembled onto the shank, and, the manner in which the assembly may be then be inserted into an aperture in a pipe.

The recessed portion 26 includes a recess 26, which is provided for a purpose which is now explained, more particularly with reference to FIGS. 2, 3 and 4. Referring firstly to FIG. 2, as the harp 12 is formed integrally with the shank portion 18 and is of greater lateral dimension than the diameter of the shank portion 18, this precludes the positioning of the nut 28 or the gasket containing collar 30 on the shank from the harp end of the assembly.

While the shank could be made of greater diameter than the lateral extent of the harp, such is precluded in practice in view of the wastage of materials that would ensue from such a construction. Also, the harp itself must of necessity be of standard dimensions, as required to accommodate a standard thermally activated release mechanism 16. On the other hand, the saddle 20 must be formed of a length appreciably greater than the diameter of the shank portion 18, for otherwise saddle would be of insufficient length for it to straddle and securely engage the inner wall of the pipe 32. Also, the saddle must be of sufficient strength for it to resist deformation under the internal pressure load exerted thereon and under the loading imposed by the nut 28 upon the clamping of the sprinkler assembly to the pipe. These constructional requirements preclude the possiblity of positioning the nut 28 or the collar 30 on the shank portion 18 by moving the nut 28 or the collar 30 past the saddle 20 in a direction axially of the shank 18. Thus, some manner of accomplishing the required assembly must be provided as is now described.

The manner in which the nut 28 may be positioned on the threaded shank portion 22 is illustrated in FIG. 2. As the threaded bore of the nut is of less diameter than the length of the saddle, clearly, the nut cannot be passed axially onto the shank. There is, however, the possibility of passing the nut 28 over the saddle 20 in a manner similar to the manner in which the saddle 20 is to be passed through the aperture in the pipe. To permit this operation, the recess 36 is formed of a width in excess of the width of the nut 28, thus enabling the nut 28 to be passed longitudinally of the saddle 20, and one side of the nut 28 to be located within the recess 36. The recess 36 is formed of sufficient depth such that the distance between the wall defining the recess 36 and the opposite end of the saddle 20 is less than the internal diameter of the nut. Thus, with the nut fully positioned within the recess 36, the nut 28 can then be moved angularly as illustrated in FIG. 4 for it to be passed over the said opposite end of the saddle. Once the nut 28 has cleared the saddle, then, it can be repositioned in axial alignment with the threaded shank section 22, and be threaded onto the shank.

Having completed this step in the assembly procedure, the collar 30 is then passed longitudinally of the saddle in an identical manner to that of the nut, and as is illustrated in FIG. 3. Again, as the internal diameter of the collar 30 is less than the length of the saddle 20, the collar cannot be passed directly onto the shank 18. It can, however, be passed onto the shank 18 by positioning one side of the collar within the recess 36, and then moving the collar angularly to pass it over the opposite end of the saddle 20.

Having completed this step in the assembly procedure, the elastomeric gasket 34 is then passed over the saddle 20 and positioned within the collar 30. Advantage is still taken of the recess 36 to facilitate this step in the assembly procedure. However, at this point in the assembly procedure the provision of the recess 36 becomes less critical in that the gasket is formed from a resiliently flexible material as opposed to being rigid and inflexible, as are the nut 28 and the collar 30. Having passed the elastomeric gasket 34 over the saddle 20, the gasket is then adjusted in position and is pressed into the collar 30 for it to assume the position shown in FIGS. 1 and 2.

It will be observed that the collar 20 is provided with an internal flange 38 which is adapted to closely encircle the sealing land 24 and prevent extrusion of the gasket. The gasket 34 is provided with a complementary gasket portion for sealing engagement with the sealing land 24, thus precluding leakage axially past the land 24 and longitudinally of the shank 18. Further, the gasket 34 includes a second sealing portion for engagement with the pipe along a continuous line which extends around the recessed portion 26 and the recess 36, thus precluding leakage in directions radially outwardly of the shank portion 18, the collar 30 being configured to compress the gasket 34 into sealing engagement with the pipe exterior.

Further, it will be noted that the gasket is subject to axial compressive stresses throughout its entire perimeter, but is confined against radially outward movement by the collar 30. This results in compressive stresses being transmitted radially inwardly against the sealing land 24, and results in axial compressive stresses reacting against the pipe periphery. These compressive stresses are to the substantial exclusion of resultant stresses acting to collapse the gasket in a radially inward direction at those locations that are unsupported by the shank portion 26, thus further enhancing the sealing capability of the gasket.

Preferably, the gasket 34 is an interference fit on the sealing land 24, in order that the gasket can retain the collar 30 positioned against the nut 28 during the manual handling of the sprinkler head assembly, prior to and during its attachment to the pipe.

In order to facilitate assembly of the sprinkler head onto the pipe, the collar 30 is provided with a cut-out portion 39 to permit angling of the collar relative to the shank 18 during insertion of the saddle 20 into the aperture in the pipe. Additionally, the collar is provided with a key 40 which is received in an axial keyway 41 in the shank 18, and which prevents rotation of the collar relative to the shank.

Referring now to FIG. 5 through 10, an alternative preferred form of sprinkler head assembly according to the present invention is shown. In FIGS. 5 through 10, the same reference numerals have been employed to identify those elements that are in common with the embodiment of FIGS. 1 through 4.

In FIGS. 5 through 10, a major difference arises in the formation of the collar 30 and the positioning of the recess 36.

In FIGS. 5 through 10, the collar 30 similarly is provided with a cut-out portion 39, this permitting the collar to be reduced in diameter without affecting its capability of being angled relative to the shank 18. Additionally, due to this freedom of angling movement, the shank portion itself can be made axially shorter, resulting in a cost and weight saving.

The recess 36 in the shank 18 is positioned spaced from the saddle, such that a continuous and an uninterrupted sealing land exists around the shank at a position intermediate the saddle 20 and the recess 36. Such a continuous sealing land is readily sealable by an O-ring as indicated at 34 in FIGS. 5, 6 and 9.

Further, in order to increase the mobility of the collar 30, the shank is tapered towards its intermediate portion. Further, to accommodate the depth of the recess 36, the central bore is offset, as indicated in dotted lines in FIG. 9.

In order to prevent rotation of the collar relative to the shank during assembly of the sprinkler onto a pipe, the collar 30 similar is provided with an axially extending key 40, which is received within a mating slot 41 in the shank 18. Such a key and slot arrangement in no way affects the angular mobility of the collar, as is required to permit assembly of the sprinkler head onto a pipe.

By providing such a key 40 and slot 41, the sprinkler assembly can be readily assembled onto a pipe in a "blind" location, the operator merely being required to manually find the aperture in the pipe with one end of the saddle, and then to insert and angularly position the saddle in proper relationship within the aperture. Such an operation readily can be performed using the tactile senses, without the necessity of having a clear view of the operation. This is of particular importance in those cases where the sprinkler assemblies are to be positioned extending upwardly, as is illustrated in FIGS. 5 through 10, as opposed to hanging downwardly as illustrated in FIGS. 1 through 4.

Figure 9:
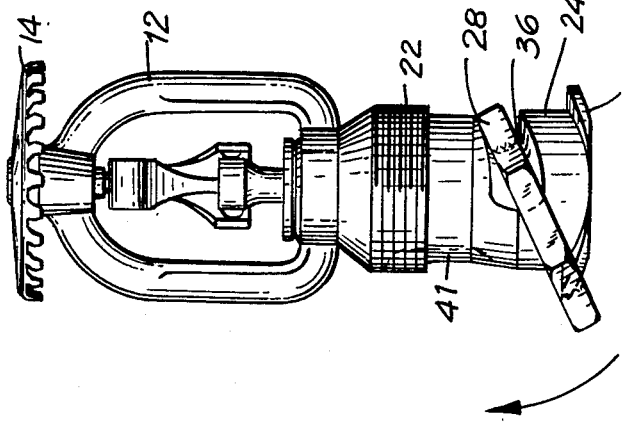

The manner of attaching the assembled sprinkler head assembly to the pipe is as shown in FIG. 9, namely, the end of the saddle adjacent the recess 36 is passed through the aperture in the pipe, the assembly is moved for the pipe periphery to be located within the recess 36, the assembly is then moved angularly to move the opposite end of the saddle through the aperture, and, the assembly is then moved reversely to bring the saddle into straddling relationship with the interior wall of the pipe, subsequent to which the nut 28 is tightened down to move the collar 30 and gasket 34 into clamping and sealing engagement with the exterior wall of the pipe.

While a preferred embodiment of the invention has been described as related to a unitary sprinkler head assembly, it will be appreciated that the present invention finds application in other environments in which it is required that a fitting, such as a faucet, stopcock, or any other desired member having dimensions greater than the diameter of the shank, is to be formed integrally with the direct connect fitting. Such a unitized assembly precludes the positioning of the nut, collar and gasket directly on the shank portion 18 by passing those members axially onto the shank portion 18 from either end thereof.

Various modifications may be made in the shape and configuration of the saddle portion 20, provided that the essential consideration is observed that the distance between the wall of the recess 36 and the opposite end of the saddle be no greater than the smallest of the internal diameters of the nut 28 and collar 30, and, that the recess 36 be formed of sufficient width to permit the nut and the collar to move into the recess a distance sufficient for the nut and collar to clear the said opposite end of the saddle, and thus permit angular movement of the nut or the collar over the said opposite end of the saddle. The length of the saddle immediately adjacent the recess may be formed of any convenient length greater than that of the opposite end of the saddle, such as may be desirable in the event that the unitary assembly is in the form of a faucet, stopcock or the like.

From the foregoing, it will be appreciated that a monolithic assembly of a plumbing fitting and a direct connect connector has been provided which facilitates assembly of the monolithic plumbing fitting onto a pipe in locations having difficult or restricted accessibility, the fitting being handleable, positionable and securable to the pipe with the use of a single hand, which then can be employed to initially tighten down the nut 28. The fitting will then be attached to the pipe with sufficient strength and stability to permit release of the fitting by that hand, and the subsequent final tightening down of the nut 28 by using an appropriate hand held wrench.

We claim:

1. A plumbing fitting when formed integrally with one end of a threaded shank having a recessed portion and a saddle integral with an opposite end of said recessed shank portion, said plumbing fitting being of greater extent in transverse direction than the diameter of said shank and precluding the threading of a locknut onto said threaded shank from the fitting end of said shank, said saddle extending radially beyond diametrically opposite sides of said shank, and being of a length greater than the internal diameter of a threaded locknut to be passed over said saddle, the diameter of said threaded shank being greater than the distance between one end of said saddle and a surface of said recess closest to said one end of the saddle, said recess having a width axially of said shank portion greater than that of a nut to be passed over said saddle and then received on said threaded shank.

2. The combination of a direct connect coupling and a plumbing fitting such as a sprinkler head formed integrally therewith, said (plumbing fitting) coupling having a threaded shank portion commencing at one end in said plumbing fitting and terminating in a saddle at (one) an opposite end thereof, said plumbing fitting being of greater extent in a transverse direction than the diameter of said shank and precluding the threading of a locknut onto said threaded shank from the fitting end of said shank, a locknut threaded onto said shank, and a collar and a gasket positioned on said shank intermediate said saddle and said locknut, said saddle being of greater longitudinal dimension than the diameter of the shank and extending radially beyond diametrically opposite sides of said shank, the shank being of greater diameter than the lateral dimension of the saddle, and, a shank portion intermediate said threaded shank and said saddle, said shank portion being recessed adjacent one end of said saddle, said threaded shank being of greater diameter than the distance between the other end of said saddle and the surface of said recess closest thereto, said recess having a width axially of said shank portion greater than the axial width of the locknut, said locknut, gasket collar and gasket having been passed longitudinally of said saddle from said one end of the recess, entered into said recess, and then moved angularly within said recess and passed over the said other end of said saddle, and then oriented into axial alignment with said threaded shank and said shank portion.

3. The fitting of claim 1, in which said collar accommodates and O-ring seal and said shank is provided with an uninterrupted sealing land intermediate the saddle and said recess.

4. A sprinkler assembly for direct connection to a pipe of a sprinkler system, said sprinkler assembly including in combination:

a thermally activated sprinkler head; a threaded shank integral with said sprinkler head, said sprinkler head being of greater dimension in a lateral direction than the diameter of said threaded shank;

a locknut positioned on said threaded shank;

a gasket collar and gasket assembly positioned on said threaded shank and located at that side of the locknut remote from said sprinkler head;

a locating and retaining saddle integral with said threaded shank and located at that end of said shank that is remote from said sprinkler head, said saddle being elongate and having ends adapted to be passed through a circular opening in a pipe and then oriented and positioned for them to straddle said opening;

said threaded shank having a diameter greater than the lateral dimension said saddle, and said saddle having a length greater than the diameter of said threaded shank and extending radially beyond diametrically opposite sides of said threaded shank;

a shank portion intermediate said threaded shank and said saddle, said shank portionb eing recessed at a position adjacent one end of said saddle with said recess extending towards the other end of said saddle and inwardly of said shank portion, said recess having a width axially of said shank portion greater than the width of said nut;

said threaded shank having a diameter greater than the distance between said other end of said saddle and a surface of said recessed shank portion closest to said other end of said saddle;

whereby said locknut, gasket collar and gasket sequentially can be passed longitudinally of said saddle from said one end thereof, entered into said recess, and then moved angularly within said recess and passed over the said other end of said saddle, and then be oriented into axial alignment with said threaded shank and said shank portion.

5. The sprinkler assembly of claim 4, in which said collar includes a cut-out area providing for angling of the collar relative to the shank during the installation of the sprinkler assembly on the pipe.

6. The sprinkler assembly of claim 5, in which said collar accommodates on O-ring seal, and said shank is provided with an uninterrupted sealing land intermediate the saddle and said recess.

* * * * *